(12) United States Patent
Gu et al.

(10) Patent No.: US 12,126,042 B2
(45) Date of Patent: Oct. 22, 2024

(54) BATTERY CELL, BATTERY, POWER CONSUMPTION APPARATUS, METHOD AND APPARATUS FOR PRODUCING BATTERY CELL

(71) Applicant: CONTEMPORARY AMPEREX TECHNOLOGY (HONG KONG) LIMITED, Hong Kong (CN)

(72) Inventors: Mingguang Gu, Fujian (CN); Xiaobo Chen, Fujian (CN); Yao Li, Fujian (CN); Xianda Li, Fujian (CN); Jinru Yue, Fujian (CN); Piaopiao Yang, Fujian (CN); Lu Hu, Fujian (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 369 days.

(21) Appl. No.: 17/563,885

(22) Filed: Dec. 28, 2021

(65) Prior Publication Data
US 2022/0336913 A1 Oct. 20, 2022

Related U.S. Application Data

(63) Continuation of application No. PCT/CN2021/087758, filed on Apr. 16, 2021.

(51) Int. Cl.
H01M 50/325 (2021.01)
H01M 50/124 (2021.01)
(Continued)

(52) U.S. Cl.
CPC ..... H01M 50/325 (2021.01); H01M 50/1243 (2021.01); H01M 50/171 (2021.01);
(Continued)

(58) Field of Classification Search
CPC ........... H01M 50/325; H01M 50/1243; H01M 50/171; H01M 50/209; H01M 2200/20;
(Continued)

(56) References Cited

U.S. PATENT DOCUMENTS 4,774,155 A * 9/1988 Nientiedt .......... H01M 50/3425
429/56
6,818,342 B1 * 11/2004 Okamoto .......... H01M 50/3425
429/57
(Continued)

FOREIGN PATENT DOCUMENTS

CN 204303875 U 4/2015
CN 207021326 U 2/2018
(Continued)

OTHER PUBLICATIONS

Extended European Search Report dated Oct. 17, 2022 received in European Patent Application No. EP 21785745.7.
(Continued)

Primary Examiner — Michael L Dignan
(74) Attorney, Agent, or Firm — Scully, Scott, Murphy & Presser, P.C.

(57) ABSTRACT

Embodiments of the present application provide a battery cell, a battery, a power consumption apparatus, a method for producing a battery cell and an apparatus for producing a battery cell. The battery cell includes: a pressure relief mechanism, the pressure relief mechanism being disposed on at least one wall of the battery cell; and a protective film enclosing an outer surface of the at least one wall, the protective film being configured to provide insulation protection for the at least one wall; where the protective film includes a first portion at least covering the pressure relief mechanism. Through technical solutions of the embodiments of the present application, insulation performance of a battery cell could be improved; meanwhile, deformation of
(Continued)

a pressure relief mechanism could be suppressed, creep of the pressure relief mechanism could be reduced, and the service life of the pressure relief mechanism could be increased.

14 Claims, 7 Drawing Sheets

(51) Int. Cl.
  *H01M 50/171* (2021.01)
  *H01M 50/209* (2021.01)
(52) U.S. Cl.
  CPC ...... *H01M 50/209* (2021.01); *H01M 2200/20* (2013.01); *H01M 2220/20* (2013.01)
(58) Field of Classification Search
  CPC ......... H01M 2220/20; H01M 2200/10; H01M 50/3425; H01M 50/375; H01M 50/103; H01M 50/543; H01M 50/593; Y02E 60/10
  See application file for complete search history.

(56) References Cited

U.S. PATENT DOCUMENTS

| | | | | |
|---|---|---|---|---|
| 8,354,181 | B2 * | 1/2013 | Suzuki | H01M 50/124 |
| | | | | 429/185 |
| 9,065,113 | B2 * | 6/2015 | Ahn | H01M 50/342 |
| 9,147,867 | B2 * | 9/2015 | Ito | H01M 50/3425 |
| 11,404,744 | B1 | 8/2022 | Yang et al. | |
| 2009/0220850 | A1 | 9/2009 | Bitsche et al. | |
| 2010/0273034 | A1 | 10/2010 | Hermann et al. | |
| 2012/0308858 | A1 | 12/2012 | Hermann et al. | |
| 2012/0308859 | A1 | 12/2012 | Hermann et al. | |
| 2013/0330580 | A1 * | 12/2013 | Yamamoto | H01M 50/342 |
| | | | | 429/54 |
| 2019/0181408 | A1 * | 6/2019 | Jang | H01M 50/375 |
| 2021/0036284 | A1 | 2/2021 | Schüssler et al. | |
| 2022/0013848 | A1 | 1/2022 | Zeng et al. | |
| 2022/0302551 | A1 | 9/2022 | Yang et al. | |

FOREIGN PATENT DOCUMENTS

| | | |
|---|---|---|
| CN | 209401662 U | 9/2019 |
| CN | 112086605 A | 12/2020 |
| CN | 112397845 A | 2/2021 |
| CN | 112531278 A | 3/2021 |
| EP | 2244318 A2 | 10/2010 |
| JP | 2005142115 A | 6/2005 |
| JP | 2010049883 A | 3/2010 |
| JP | 2011060600 A | 3/2011 |
| JP | 2013191542 A | 9/2013 |
| JP | 2015028870 A | 2/2015 |
| KR | 20110128051 A | 11/2011 |
| WO | 2022006901 A1 | 1/2022 |
| WO | 2022193082 A1 | 9/2022 |

OTHER PUBLICATIONS

Notice of Reasons for Refusal dated Jul. 24, 2023 received in Japanese Patent Application No. JP 2022-547739.
Request for the Submission of an Opinion dated Jul. 24, 2024 received in Korean Patent Application No. 10-2022-7026952.

* cited by examiner

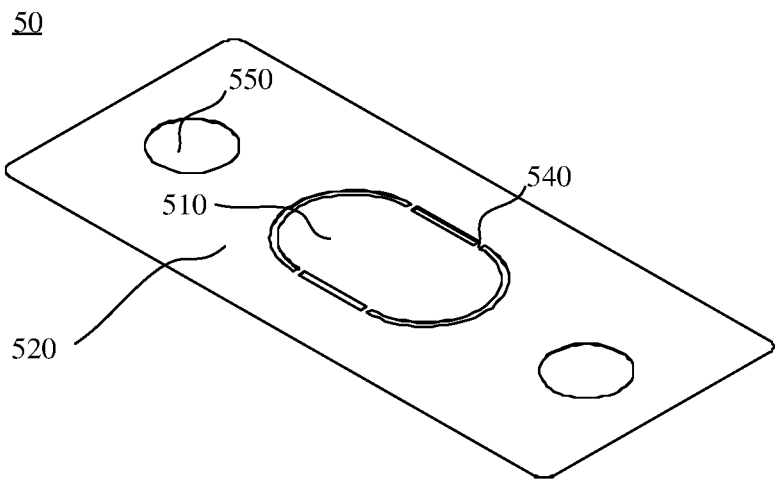

FIG. 12

| 300 | |
|---|---|
| Disposing a pressure relief mechanism on at least one wall of the battery cell | 310 |
| Enclosing an outer surface of the at least one wall with a protective film, the protective film being configured to provide insulation protection for the at least one wall; wherein the protective film comprises a first portion, and the first portion at least covers the pressure relief mechanism | 320 |

FIG. 13

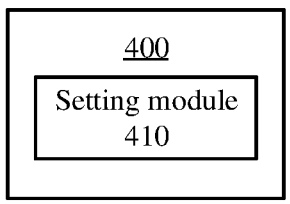

FIG. 14

BATTERY CELL, BATTERY, POWER CONSUMPTION APPARATUS, METHOD AND APPARATUS FOR PRODUCING BATTERY CELL

CROSS-REFERENCE TO RELATED APPLICATIONS

This application is a continuation of International Application No. PCT/CN2021/087758, filed on Apr. 16, 2021, the disclosure of which is hereby incorporated by reference in its entirety.

TECHNICAL FIELD

The present application relates to the field of battery technologies, and in particular, to a battery cell, a battery, a power consumption apparatus, a method and an apparatus for producing a battery cell.

BACKGROUND

Energy conservation and emission reduction are the key to the sustainable development of the automotive industry. In this case, electric vehicles have become an important part of the sustainable development of the automotive industry due to their advantages of energy conservation and environmental protection. For the electric vehicles, the battery technology is an important factor for their development.

In the development of the battery technology, in addition to improving performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

The present application provides a battery cell, a battery, a power consumption apparatus, a method for producing a battery cell and an apparatus for producing a battery cell, which could enhance safety of the battery.

In a first aspect, a battery cell is provided, including: a pressure relief mechanism, the pressure relief mechanism being disposed on at least one wall of the battery cell, and the pressure relief mechanism being configured to be actuated when an internal pressure or temperature of the battery cell reaches a threshold, to relieve the internal pressure; and a protective film enclosing an outer surface of the at least one wall, the protective film being configured to provide insulation protection for the at least one wall; where the protective film includes a first portion, and the first portion at least covers the pressure relief mechanism.

In an embodiment of the present application, by providing a protective film enclosing an outer surface of at least one wall for a battery cell, insulation protection can be provided for the battery cell, and insulation performance of the battery cell can be improved; meanwhile, a first portion of the protective film that at least covers a pressure relief mechanism can have a suppression effect on a certain degree of deformation of the pressure relief mechanism, and reduce creep of the pressure relief mechanism, thereby increasing the service life of the pressure relief mechanism, and further enhancing safety performance of a battery.

In some embodiments, an area of the first portion is larger than an area of a region where the pressure relief mechanism is located, and a region of the first portion that exceeds the pressure relief mechanism is adhered to the outer surface of the at least one wall.

By setting that an area of the first portion is larger than an area of a region where the pressure relief mechanism is located and a region of the first portion that does not cover the pressure relief mechanism is adhered to the at least one wall, it can have a suppression effect on the deformation of the pressure relief mechanism through an adhesive force generated between the first portion and the at least one wall, and the creep of the pressure relief mechanism can be reduced, thereby increasing the service life of the pressure relief mechanism, and further enhancing the safety performance of the battery.

In some embodiments, a shape of the first portion is the same as or similar to a shape of the pressure relief mechanism.

By setting that a shape of the first portion is the same as or similar to that of the pressure relief mechanism, it can be ensured that a force generated by the deformation of the pressure relief mechanism that the protective film is subjected to is uniform, which is more beneficial to suppression of the deformation of the pressure relief mechanism by the first portion.

In some embodiments, an edge of the first portion exceeds an edge of the pressure relief mechanism by 6 mm~10 mm in a direction far away from a center of the pressure relief mechanism.

By setting an appropriate size for an edge of the first portion that exceeds an edge of the pressure relief mechanism, it can be ensured that the first portion could have a suppression effect on a certain degree of deformation of the pressure relief mechanism; meanwhile, it can also be ensured that the first portion can be damaged when the internal pressure and temperature of the battery cell reach a certain threshold, so that the first portion falls off, thereby ensuring normal actuation of the pressure relief mechanism, not affecting normal use of the pressure relief mechanism, and ensuring the safety of the battery.

In some embodiments, at least one wall of the battery cell includes a housing, the housing forms an accommodating cavity with an opening for accommodating an electrode assembly of the battery cell, and the protective film encloses an outer surface of the housing.

The battery cell in the embodiment of the present application may include a housing, where the housing may be an accommodating cavity with an opening that is composed of five walls except a cover plate, and the protective film in the embodiment of the present application may completely or largely enclose an outer surface of the foregoing housing, thereby performing insulation protection for the battery cell.

In some embodiments, the protective film further includes an isolation region and a second portion, the first portion is separated from the second portion by the isolation region, and the second portion covers an outer surface of the at least one wall other than a region covered by the first portion.

In addition to the first portion, the protective film in the embodiment of the present application further includes a second portion, where the first portion and the second portion are separated by an insulation region, and the second portion may cover a region on the battery cell other than a region covered by the first portion. Therefore, in the embodiment of the present application, the protective film can suppress the deformation of the pressure relief mechanism through the first portion, and the second portion of the protective film can achieve insulation protection for the battery cell at the same time.

In some embodiments, the isolation region is disposed around an outer edge of the pressure relief mechanism.

The insulation region disposed around the edge of the pressure relief mechanism can divide the protective film into a first portion covering the pressure relief mechanism and a second portion not covering the pressure relief mechanism.

In some embodiments, the isolation region is coherent, and the first portion and the second portion are not connected.

In an embodiment of the present application, when the isolation region is a coherent region, and there is no connecting point between the first portion and the second portion, relying on a portion where the edge of the first portion is adhered to a surface of the at least one wall, the first portion can have a suppression effect on the deformation of the pressure relief mechanism to some extent, and reduce the creep of the pressure relief mechanism, thereby increasing the service life of the pressure relief mechanism, and further enhancing the safety performance of the battery.

In some embodiments, the isolation region is incoherent, a connecting point is disposed between the first portion and the second portion, and the first portion and the second portion are connected through the connecting point.

The isolation region in the embodiment of the present application may also be incoherent, the first portion can be connected to the second portion through a connecting point. Due to the existence of the connecting point, there is a restraining force between the first portion and the second portion, and the restraining force can have a suppression effect on the deformation of the pressure relief mechanism to some extent.

In some embodiments, a number of connecting points is positively correlated with a size of an edge of the first portion that exceeds an edge of the pressure relief mechanism in a direction far away from a center of the pressure relief mechanism.

Due to the existence of the connecting point, there is a restraining force between the first portion and the second portion, and the restraining force can suppress the deformation of the pressure relief mechanism. Moreover, as the number of connecting points increases, the restraining force increases. Meanwhile, since there is also a certain restraining force between a position of the first portion that exceeds the edge of the pressure relief mechanism and the surface of the at least one wall of the battery cell, the restraining force increases with the increase of an area of an overlap region. Therefore, the foregoing two manners can be combined to determine the appropriate number of connecting points and the size of the first portion that exceeds the edge of the pressure relief mechanism. For example, when the number of connecting points is great, a smaller size that exceeds the edge can be set, so that the first portion can ensure the suppression of a certain degree of deformation of the pressure relief mechanism, and ensure the normal operation of the pressure relief mechanism.

In some embodiments, the battery cell includes two electrode terminals with opposite polarities, and at least two connecting points are disposed along a direction of a line between the two electrode terminals.

It should be understood that in the battery cell, when there are electrode terminals, a position where an amount of deformation of the battery cell is maximum may appear in a direction along a line between two battery terminals. Therefore, the connecting point can be disposed in a direction of a line between two electrode terminals to achieve a better effect of suppressing the deformation of the pressure relief mechanism.

In some embodiments, the protective film is a patch, and the protective film is adhered to the outer surface of the at least one wall by an adhesive.

The protective film in the embodiment of the present application may be a patch, such as a plastic path, or a blue film. The patch may be adhered to a surface of at least one wall by an adhesive, and through the adhesion between the protective film and the at least one wall, the deformation of the pressure relief mechanism can be effectively suppressed, and the creep of the pressure relief mechanism can be reduced, thereby increasing the service life of the pressure relief mechanism.

In some embodiments, the first portion is spaced apart from the pressure relief mechanism.

When the protective film in the embodiment of the present application is a patch, since the patch is directly adhered to a surface of at least one wall, there may be a gap between the first portion and the pressure relief mechanism when the pressure relief mechanism in the embodiment of the present application is embedded in the surface of the at least one wall of the battery cell, the gap can allow a certain degree of deformation of the pressure relief mechanism to be suppressed by the first portion, and the creep of the pressure relief mechanism is reduced, thereby increasing the service life of the pressure relief mechanism.

In some embodiments, an isolation region is formed by laser ablation of the protective film.

When the protective film in the embodiment of the present application is a patch, the protective film can be processed by a laser ablation process to form an insolation region separating the first portion from the second portion. By the laser ablation process, only a motion track and ablation power of a laser head can be adjusted according to the size and shape of the first portion on the basis of the existing processes, and there is no need to repeat open molding, thereby reducing the processing costs.

In some embodiments, the protective film is a coating, and outer surfaces of the at least one wall and the pressure relief mechanism are coated with the protective film by means of spraying.

A coating may be adopted for the protective film in the embodiment of the present application. In this case, at least one wall of the battery cell can be coated with the coating by means of spraying. Since the coating is sprayed, the coating can be in direct contact with the pressure relief mechanism, that is, the coating directly covers the surface of the pressure relief mechanism. In this case, since the surface of the pressure relief mechanism is directly coated with the coating, there is also a restraining force between the coating and the pressure relief mechanism, and the restraining force can have a suppression effect on the deformation of the pressure relief mechanism.

In some embodiments, an isolation region is formed by skipping coating some reserved region when surfaces of the at least one wall and the pressure relief mechanism are coated with the protective film.

When the protective film in the embodiment of the present application is a coating, the isolation region on the protective film may be an isolation region formed by skipping coating some reserved region when the coating is sprayed, for example, by placing a mold in a certain shape in advance at a position where the isolation region is formed, so as to prevent the coating from being coated at the position of the isolation region.

In some embodiments, a thickness of the first portion is greater than a thickness of a second portion.

When the protective film in the embodiment of the present application is a coating, within a certain range, a coating thickness is greater, and a restraining force produced between the coating and the pressure relief mechanism is greater. Therefore, the first portion can be set to have a greater thickness to suppress the deformation of the pressure relief mechanism better.

In a second aspect, a battery is provided, including: a plurality of battery cells, the plurality of battery cells including the battery cell according to the first aspect;

where the plurality of battery cells are insulated from each other through the protective film.

In a third aspect, a power consumption apparatus is provided, including the battery according to the second aspect.

In some embodiments, the power consumption apparatus is a vehicle, a ship or a spacecraft.

In a fourth aspect, a method for producing a battery cell is provided, including: disposing a pressure relief mechanism on at least one wall of the battery cell, the pressure relief mechanism being configured to be actuated when an internal pressure or temperature of the battery cell reaches a threshold, to relieve the internal pressure; and enclosing an outer surface of the at least one wall with a protective film, the protective film being configured to provide insulation protection for the at least one wall; where the protective film includes a first portion, and the first portion at least covers the pressure relief mechanism.

In some embodiments, an area of the first portion is larger than an area of a region where the pressure relief mechanism is located, and a region of the first portion that exceeds the pressure relief mechanism is adhered to the outer surface of the at least one wall.

In some embodiments, a shape of the first portion is set to be the same as or similar to a shape of the pressure relief mechanism.

In some embodiments, an edge of the first portion is set to exceed an edge of the pressure relief mechanism by 6 mm~10 mm in a direction far away from a center of the pressure relief mechanism.

In some embodiments, at least one wall of the battery cell includes a housing, the housing forms an accommodating cavity with an opening for accommodating an electrode assembly of the battery cell, and the protective film encloses an outer surface of the housing.

In some embodiments, the protective film further includes an isolation region and a second portion, the first portion is separated from the second portion by the isolation region, and the enclosing the outer surface of the at least one wall with the protective film includes: allowing the second portion to cover an outer surface of the at least one wall other than a region covered by the first portion.

In some embodiments, the isolation region is disposed around an outer edge of the pressure relief mechanism.

In some embodiments, the isolation region is coherent, and the first portion and the second portion are not connected.

In some embodiments, the isolation region is incoherent, a connecting point is disposed between the first portion and the second portion to form the incoherent isolation region, and the first portion and the second portion are connected through the connecting point.

In some embodiments, a number of connecting points is positively correlated with a size of an edge of the first portion that exceeds an edge of the pressure relief mechanism in a direction far away from a center of the pressure relief mechanism.

In some embodiments, the battery cell includes two electrode terminals with opposite polarities, and at least two connecting points are disposed along a direction of a line between the two electrode terminals.

In some embodiments, the protective film is a patch, and the enclosing the outer surface of the at least one wall with the protective film includes: adhering the protective film to the outer surface of the at least one wall by an adhesive.

In some embodiments, the first portion is spaced apart from the pressure relief mechanism.

In some embodiments, the isolation region is formed by laser ablation of the protective film after adhering the protective film to the outer surface of the at least one wall by the adhesive.

In some embodiments, the protective film is a coating, and the enclosing the outer surface of the at least one wall with the protective film includes: coating outer surfaces of the at least one wall and the pressure relief mechanism with the protective film by means of spraying.

In some embodiments, the enclosing the outer surface of the at least one wall with the protective film further includes: skipping coating some reserved region to form the isolation region when the outer surfaces of the at least one wall and the pressure relief mechanism are coated with the protective film.

In some embodiments, a coating thickness of the first portion is set to be greater than a coating thickness of the second portion.

In a fifth aspect, an apparatus for producing a battery cell is provided, including: a setting module, the setting module being configured to: dispose a pressure relief mechanism on at least one wall of the battery cell, the pressure relief mechanism being configured to be actuated when an internal pressure or temperature of the battery cell reaches a threshold, to relieve the internal pressure; and cover an outer surface of the at least one wall with a protective film, the protective film being configured to provide insulation protection for the at least one wall; where the protective film includes a first portion, and the first portion at least covers the pressure relief mechanism.

BRIEF DESCRIPTION OF DRAWINGS

In order to illustrate the technical solutions in embodiments of the present application more clearly, brief description will be made below to accompanying drawings required in the embodiments of the present application. Apparently, the accompanying drawings described below are some embodiments of the present application only, and other drawings could be obtained based on these accompanying drawings by those ordinary skilled in this art without creative efforts.

FIG. 7b is a plan schematic diagram corresponding to the battery cell in FIG. 7a;

FIG. 12 is a plan schematic diagram of a protective film disclosed in an embodiment of the present application;

FIG. 13 is a schematic flowchart of a method for producing a battery cell disclosed in an embodiment of the present application; and FIG. 14 is a schematic block diagram of an apparatus for producing a battery cell disclosed in an embodiment of the present application.

Figure 1:
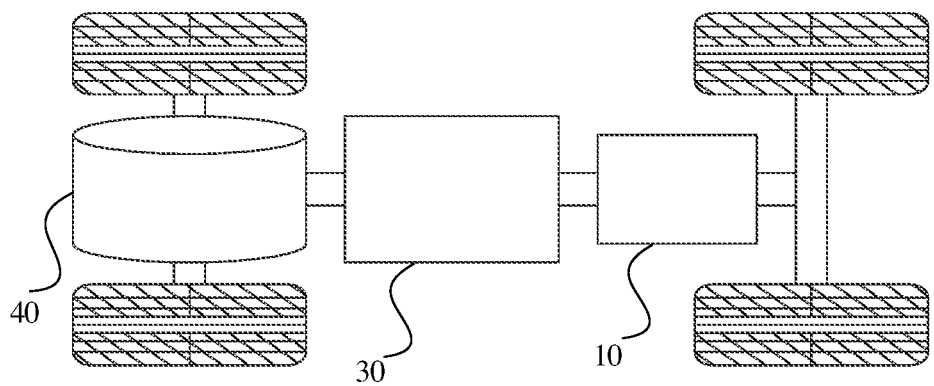
FIG. 1 is a schematic structural diagram of a vehicle disclosed in an embodiment of present application.

In the accompanying drawings, the accompanying drawings are not drawn to actual scale.

DESCRIPTION OF EMBODIMENTS

Implementation manners of the present application will be further described below in detail with reference to the accompanying drawings and embodiments. The detailed description of the following embodiments and the accompanying drawings are used to exemplarily illustrate principles of the present application, but cannot be used to limit the scope of the present application, that is, the present application is not limited to the described embodiments.

In the description of the present application, it should be noted that, unless otherwise illustrated, "a plurality of" means more than two; and orientations or positional relationships indicated by terms such as "up", "down", "left", "right", "inside", and "outside" are merely for convenience of describing the present application and for simplifying the description, rather than for indicating or implying that an indicated apparatus or element must have a specific orientation, and must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within an allowable range of error. "Parallel" is not strictly parallel, but within an allowable range of error.

The terms representing directions in the following description are all directions shown in the drawings, and do not limit the specific structure of the present application. In the description of the present application, it should be further noted that, unless explicitly specified and defined otherwise, terms "installation", "interconnection" and "connection" should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

A protective film of the embodiments of the present application may be configured to wrap a battery cell. The protective film may be an insulating and waterproof material for insulation, isolation and waterproofing of the battery cell. The protective film may further wrap a battery assembly, the battery assembly may be a battery cell or an assembly formed by a battery cell, for example, a battery cell group formed by a plurality adjacent battery cells. In this case, the plurality of adjacent battery cells are integrally wrapped by the protective film of the embodiments of the present application. For convenience of description, an example that a protective film wraps a battery cell will be illustrated below, which is not limited in the embodiments of the present application.

The protective film in the embodiments of the present application may be a protective film enclosing at least one wall of a battery cell after the steps such as a performance test are performed on the battery cell during the molding process of the battery cell, thereby performing insulation protection for the battery cell.

Optionally, the protective film in the embodiments of the present application may be a blue film commonly used in the field of batteries.

In the present application, a battery cell may include a primary battery, a secondary battery, such as a lithium-ion battery, a lithium-sulfur battery, a sodium lithium-ion battery, a sodium-ion battery or a magnesium-ion battery, which is not limited in the embodiments of the present application. The battery cell may be cylindrical, flat, cuboid or in another shape, which is also not limited in the embodiments of the present application. A battery cell is generally divided into three types according to the way of packaging: a cylindrical battery cell, a prismatic battery cell and a pouch battery cell, which is also not limited in the embodiments of the present application.

The battery mentioned in the embodiments of the present application refers to a single physical module including one or more battery cells to provide a higher voltage and capacity. The battery pack generally includes a box for packaging one or more battery cells. The box can avoid liquid or other foreign matters to affect charging or discharging of the battery cell.

The battery cell includes an electrode assembly and an electrolyte, and the electrode assembly includes a positive electrode sheet, a negative electrode sheet and a separator. The operation of the battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, the current collector not coated with the positive electrode active material layer protrudes from the current collector coated with the positive electrode active material layer, and the current collector not coated with the positive electrode active material layer serves as a positive tab. In an example of a lithium-ion battery, a material of the positive electrode current collector may be aluminum, and a positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the current collector not coated with the negative electrode active material layer protrudes from the current collector coated with the negative electrode active material layer, and the current collector not coated with the negative electrode active material layer serves as a negative tab. A material of the negative electrode current collector may be copper, and a negative electrode active material may be carbon, silicon, or the like. In order to ensure that no fusing occurs when a large current passes, there are a plurality of positive tabs which are stacked together, and there are a plurality of negative tabs which are stacked together. A material of the protective film may be Polypropylene (PP), Polyethylene (PE), or the like. In addition, the electrode assembly may be a winding structure or a laminated structure, and the embodiments of the present application are not limited thereto. With the development of the battery technology, it is necessary to consider design factors in multiple aspects simultaneously, such as energy density, cycle life, discharge capacity, C-rate and other performance parameters. In addition, safety of the battery should also be considered.

For a battery, a main safety hazard comes from charging and discharging processes, and in order to improve safety performance of the battery, a battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design demands. The predetermined threshold may depend on a material of one or more of a positive electrode sheet, a negative electrode sheet, an electrolyte and a separator in the battery cell. The pressure relief mechanism may adopt, for example, a pressure-sensitive or temperature-sensitive element or component. That is, when the internal pressure or temperature of the battery cell reaches the predetermined threshold, the pressure relief mechanism is actuated, so as to form a channel for relieving the internal pressure or temperature.

The "actuation" mentioned in the present application means that the pressure relief mechanism acts, so that the internal pressure and temperature of the battery cell can be relieved. The action generated by the pressure relief mechanism may include but be not limited to: at least a part of the pressure relief mechanism being fractured, torn or melted, and so on. After the pressure relief mechanism is actuated, high-temperature and high-pressure substances inside the battery cell are discharged outward from the pressure relief mechanism as emissions. In this way, the pressure of the battery cell can be relieved at a controllable pressure or temperature, thereby avoiding potentially more serious accidents.

The emissions from the battery cell mentioned in the present application include but are not limited to: an electrolyte, dissolved or split positive and negative electrode sheets, fragments of a separator, high-temperature and high-pressure gas generated by reaction, flame, or the like.

The pressure relief mechanism on the battery cell has an important impact on the safety of the battery. For example, when short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current solutions of the pressure relief mechanism, the internal pressure or temperature can be released outward after the actuation of the pressure relief mechanism, to ensure the safety performance of the battery cell. However, before the pressure relief mechanism is actuated, creep phenomenon occurs in the pressure relief mechanism under the long-term stress effect and higher and higher temperature effect. The creep phenomenon of the pressure relief mechanism is embodied as grain boundary sliding of the pressure relief mechanism in the microscopic view, grains spread along the grain boundary, and finally the pressure relief mechanism becomes thinner in structure, resulting in a decrease in capacity to bear pressure for the pressure relief mechanism, that is, the pressure relief mechanism deforms and there is a thinning region. Over time, an amount of deformation of the pressure relief mechanism becomes greater, so that the actuation pressure of the pressure relief mechanism becomes less. If the amount of deformation of the pressure relief mechanism is not controlled, a creep failure phenomenon that the pressure relief mechanism is torn occurs when the amount of deformation of the pressure relief mechanism reaches a certain degree, which reduces the service life of the pressure relief mechanism, and further reduces the service life of the battery. Moreover, this creep failure phenomenon is concealed and is not easy to be found, so that the failed pressure relief mechanism is not easy to be found, which greatly affects the safety performance of the battery.

In view of this, an embodiment of the present application provides a technical solution that at least one wall of a battery cell that includes a pressure relief mechanism is enclosed with a protective film, where a first portion included in the protective film at least covers the pressure relief mechanism. On one hand, by enclosing the battery cell, a surface of the battery cell can be insulated and protected, thereby improving insulation and isolation performance of the battery cell. On the other hand, by covering the pressure relief mechanism of the battery cell, the protective film can suppress deformation of the pressure relief mechanism, thereby reducing an amount of creep of the pressure relief mechanism, increasing the service life of the pressure relief mechanism, and further improving the safety of the battery.

The technical solutions described in the embodiments of the present application are all applicable to various apparatuses using batteries, such as mobile phones, portable devices, notebook computers, electromobiles, electric toys, electric tools, electric vehicles, ships and spacecrafts. For example, the spacecrafts include airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. The vehicle 1 may be internally provided with a motor 40, a controller 30 and a battery 10, and the controller 30 is configured to control the battery 10 to supply power to the motor 40. For example, the battery 10 may be disposed at the bottom, head or tail of the vehicle 1. The battery 10 may be used for power supply to the vehicle 1. For example, the battery 10 may serve as an operation power source of the vehicle 1 for a circuit system of the vehicle 1, for example, for a working power demand of the vehicle 1 during startup, navigation and running. In another embodiment of the present application, the battery 10 may serve not only as an operation power source of the vehicle 1, but also as a driving power source of the vehicle 1, replacing or partially replacing fuel or natural gas to provide a driving force for the vehicle 1.

In order to meet different power demands, the battery may include a plurality of battery cells, where the plurality of battery cells may be in series connection, parallel connection or series-parallel connection. The series-parallel connection refers to a combination of series connection and parallel connection. The battery may also be referred to as a battery pack. Optionally, the plurality of battery cells may be first connected in series, in parallel or in series and parallel to constitute a battery module, and then a plurality of battery modules are connected in series, in parallel or in series and parallel to constitute the battery. That is, the plurality of battery cells may directly constitute the battery, or may first constitute a battery module, and then battery modules constitute the battery.

Figure 2:
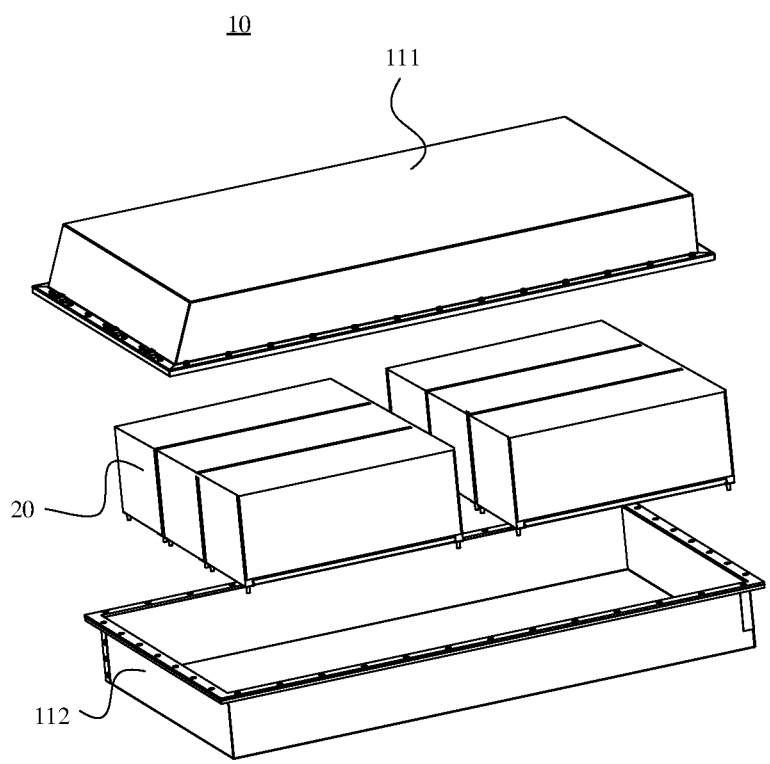
FIG. 2 is a schematic structural diagram of a battery disclosed in an embodiment of the present application.

For example, as shown in FIG. 2, FIG. 2 is a schematic structural diagram of a battery 10 according to an embodiment of the present application. The battery 10 may include a plurality of battery cells 20. The battery 10 may further include a box (which is also referred to as a covering), an inside of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. Shapes of the first portion 111 and the second portion 112 may be determined according to a shape of a plurality of combined battery cells 20, and the first portion 111 and the second portion 112 may each have an opening. For example, the first portion 111 and the second portion 112 each may be a hollow cuboid and each have only one face as an opening face, and an opening of the first portion 111 is arranged opposite to an opening of the second portion 112. The first portion 111 and the second portion 112 are fastened to each other to form a box with a closed chamber. The plurality of battery cells 20 are combined in parallel connection or series connection or series-parallel connection and then placed in the box formed after the first portion 111 to the second portion 112 are fastened.

Optionally, the battery 10 may further include other structures, which will not be repeated redundantly herein. For example, the battery 10 may further include a bus component. The bus component is configured to implement electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism to pass through the box.

Figure 3:
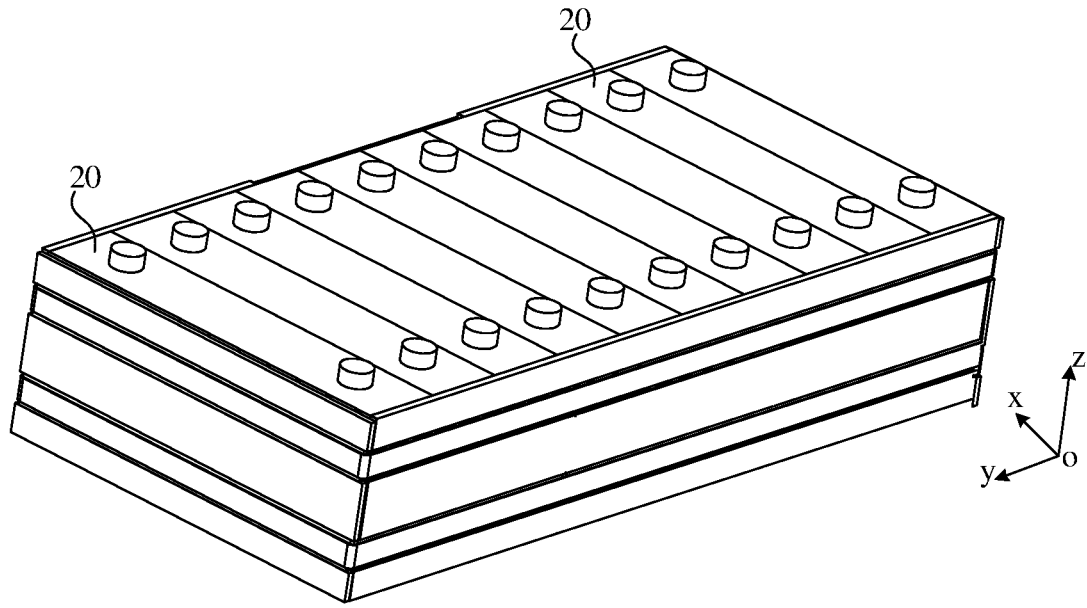
FIG. 3 is a schematic structural diagram of a battery cell group disclosed in an embodiment of the present application.

According to different power demands, the number of battery cells 20 may be set to any value. The plurality of battery cells 20 may be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of battery cells 20 included in the battery module is not limited and may be set according to demands. For example, FIG. 3 is an example of the battery module. A battery may include a plurality of battery modules, and these battery modules may be connected in series, in parallel or in series and parallel.

Figures 4, 5:
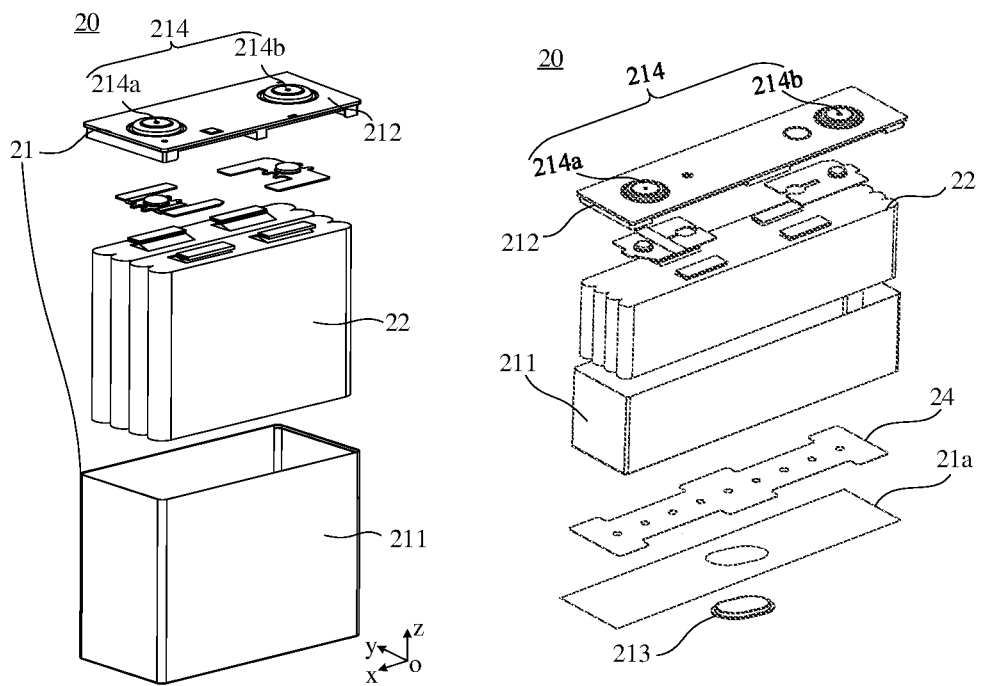
FIG. 4 is an exploded view of a battery cell disclosed in an embodiment of the present application.
FIG. 5 is an exploded view of a battery cell disclosed in another embodiment of the present application.

As shown in FIG. 4, FIG. 4 is a schematic structural diagram of a battery cell 20 according to an embodiment of the present application. The battery cell 20 includes one or more electrode assemblies 22, a housing 211 and a cover plate 212. The housing 211 and the cover plate 212 form a shell 21. A wall of the housing 211 and the cover plate 212 each are referred to as a wall of the battery cell 20. The housing 211 is shaped according to a shape of the one or more combined electrode assemblies 22. For example, the housing 211 may be a hollow cuboid or cube or cylinder, and one face of the housing 211 has an opening, so that the one or more electrode assemblies 22 may be placed in the housing 211. For example, when the housing 211 is a hollow cuboid or cube, one plane of the housing 211 is an opening face, that is, the plane does not have a wall, so that an inside and outside of the housing 211 are in communication with each other. When the housing 211 may be a hollow cylinder, an end face of the housing 211 is an opening face, that is, the end face does not have a wall, so that an inside and outside of the housing 211 are in communication with each other. The cover plate 212 covers the opening and is connected to the housing 211 to form a closed cavity in which the electrode assemblies 22 are placed. The housing 211 is filled with an electrolyte, such as an electrolytic solution.

The battery cell 20 may further include an electrode terminal 214, and the electrode terminal 214 may be disposed on the cover plate 212. One end of the electrode terminal 214 is connected to the electrode assemblies 22 inside the housing 211, and the other end is connected to a power consumption device outside the housing 211, an external power source or the like, for outputting electric energy of the battery cell 20 or charging the battery cell 20. The cover plate 212 is generally in a shape of a flat plate, and the electrode terminal 214 may include two electrode terminals 214. As shown in FIG. 4, the two electrode terminals 214 are fixed on a flat plate face of the cover plate 212. The two electrode terminals 214 are a positive electrode terminal 214a and a negative electrode terminal 214b, respectively, or 214a and 214b may be electrode terminals with opposite polarities, which is not limited in the embodiments of the present application.

In this battery cell 20, according to actual use demands, the electrode assembly 22 may be set to be single or multiple in number. As shown in FIG. 4, four independent electrode assemblies 22 are disposed in the battery cell 20.

As shown in FIG. 5, FIG. 5 is a schematic structural diagram of a battery cell 20 including a pressure relief mechanism 213 according to another embodiment of the present application.

A housing 211, a cover plate 212 and an electrode assembly 22 in FIG. 5 are consistent with the housing 211, the cover plate 212 and the electrode assembly 22 in FIG. 4, which will not be repeated redundantly herein for brevity.

The pressure relief mechanism 213 may further be disposed on one wall of the battery cell 20, such as a first wall 21a as shown in FIG. 5. In FIG. 5, a bottom side of the housing 211 has an opening, the first wall 21a covers the opening at the bottom side and is connected to the housing 211, and the connection manner may be welding, connecting with an adhesive, or the like. Alternatively, the first wall 21a and the housing 211 may also be an integral structure. The pressure relief mechanism 213 is configured to be actuated when an internal pressure or temperature of the battery cell 20 reaches a threshold, to relieve the internal pressure or temperature.

The pressure relief mechanism 213 may be a part of the first wall 21a, or may be a separate structure from the first wall 21a, and is fixed to the first wall 21a by means of welding, for example. When the pressure relief mechanism 213 is a part of the first wall 21a, for example, the pressure relief mechanism 213 may be formed by providing an indentation on the first wall 21a, and a thickness of the first wall 21a corresponding to the indentation is smaller than that of another region of the pressure relief mechanism 213 other than the indentation. The indentation is the weakest position of the pressure relief mechanism 213. When excessive gas generated by the battery cell 20 causes an internal pressure of the housing 211 to rise and reach a threshold, or heat generated by an internal reaction of the battery cell 20 causes an internal temperature of the battery cell 20 to rise and reach a threshold, the pressure relief mechanism 213 may be fractured at the indentation, resulting in the communication between the inside and outside of the housing 211. The gas pressure and temperature are released outward through the cracking of the pressure relief mechanism 213, thereby avoiding explosion of the battery cell 20.

Optionally, in an embodiment of the present application, as shown in FIG. 5, in a case where the pressure relief mechanism 213 is disposed on the first wall 21a of the battery cell 20, an electrode terminal 214 is disposed on another wall of the battery cell 20, and the wall provided with the electrode terminal 214 is different from the first wall 21a.

Optionally, the wall provided with the electrode terminal 214 is arranged opposite to the first wall 21a. For example, the first wall 21a may be a bottom wall of the battery cell 20, and the wall provided with the electrode terminal 214 may be the cover plate 212 of the battery cell 20.

Optionally, as shown in FIG. 5, the battery cell 20 may further include a backing plate 24. The backing plate 24 is located between the electrode assembly 22 and a bottom wall of the housing 211, may play a role of supporting the electrode assembly 22, and may also effectively prevent the electrode assembly 22 from interfering with rounded corners of a periphery of the bottom wall of the housing 211. In addition, one or more through holes may be disposed on the backing plate 24. For example, a plurality of through holes evenly arranged may be disposed, or when the pressure relief mechanism 213 is disposed on the bottom wall of the housing 211, a through hole is disposed at a position corresponding to the pressure relief mechanism 213, so as to guide an electrolytic solution or gas. Specifically, this may cause spaces of an upper surface and a lower surface of the backing plate 24 to be in communication, and gas generated inside the battery cell 20 and the electrolytic solution can freely pass through the backing plate 24.

The pressure relief mechanism 213 and the electrode terminal 214 are disposed on different walls of the battery cell 20, so that when the pressure relief mechanism 213 is actuated, emissions from the battery cell 20 may be farther away from the electrode terminal 214, thereby reducing the impact of the emissions on the electrode terminal 214 and the bus component, and therefore safety of the battery could be enhanced.

The pressure relief mechanism 213 may be various possible pressure relief mechanisms, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 6:
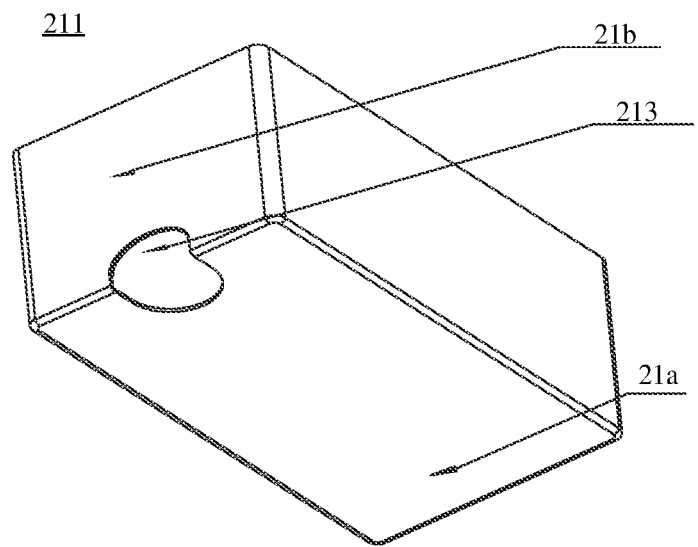
FIG. 6 is a schematic diagram of distribution of a pressure relief mechanism disclosed in an embodiment of the present application.

In the foregoing embodiments, the pressure relief mechanism 213 is located on the first wall 21a of the housing 211 as an example. Optionally, the pressure relief mechanism 213 in the embodiments of the present application may be located on the cover plate 212, or the pressure relief mechanism 213 may be located on a side wall of the housing 211, or the pressure relief mechanism 213 may be disposed at a corner part of the housing 211, for example, located at a part where two intersecting walls of the housing 211 are connected to each other, such as a schematic diagram in which a pressure relief mechanism is located at a corner of a housing in an embodiment of the present application as shown in FIG. 6. Specifically, as shown in FIG. 6, a pressure relief mechanism 213 may be disposed at a junction of a first wall 21a and a side wall 21b, and the position of the pressure relief mechanism 213 is not limited in the present application.

In the current solution of the pressure relief mechanism 213, the internal pressure or temperature can be released outward after the actuation of the pressure relief mechanism 213, to ensure the safety performance of the battery cell 20. However, the pressure relief mechanism 213 is affected by the internal temperature and pressure of the battery before the actuation to undergo creep deformation, and an excessive amount of deformation leads to creep failure of the pressure relief mechanism, which reduces the service life of the pressure relief mechanism 213.

Moreover, in the battery 10, a gas production phenomenon occurs during a chemical reaction goes on. After the chemical reaction occurs inside the battery 10 to produce gas, the gas inside the battery 10 increases. Since the entire battery 10 is sealed, the chemical gas causes the internal gas pressure of the battery 10 to gradually increase from the perspective of the entire service cycle of the battery 10. However, the battery 10 experiences operating conditions of charging and discharging and an operating condition of storage during the use, the temperature of the battery 10 itself changes periodically in a manner of increase-decrease-increase under different use operating conductions, thereby resulting in a periodical change in air pressure inside the housing of the battery with temperature, and the pressure relief mechanism, as the weakest region of the entire housing structure, produces respiratory deformation with this change in air pressure. This respiratory deformation of the pressure relief mechanism 213 caused by the use operating conditions of the battery cell 20 results in occurrence of a phenomenon of respiratory fatigue for the pressure relief mechanism 213 during the use. If the amount of deformation is great, it results in a failure phenomenon for the pressure relief mechanism 213 due to the respiratory deformation. Moreover, when the pressure relief mechanism 213 is located on a wall of the housing 211 other than the cover plate 212, since the wall of the housing 211 is generally thinner than the cover plate 212, the wall of the housing 211 on which the pressure relief mechanism 213 is located greatly deforms. Therefore, when the pressure relief mechanism 213 is located on a wall of the housing 211, the amount of deformation of the pressure relief mechanism 213 in use is greater than the amount of deformation of the pressure relief mechanism 213 located on the cover plate 212.

With respect to the foregoing problem, in the present application, a protective film is used to enclose at least one wall of the battery cell 20 that includes the pressure relief mechanism 213, where the protective film may cover the pressure relief mechanism 213. On one hand, by covering a surface of the battery cell 20, the protective film can insulate and protect the battery cell 20, thereby improving insulation and isolation performance of the battery cell 20. On the other hand, by covering the pressure relief mechanism 213 of the battery cell 20, the protective film can limit the deformation of the pressure relief mechanism 213, thereby reducing the creep deformation of the pressure relief mechanism 213, and increasing the service life of the pressure relief mechanism 213.

For ease of understanding, an example that a pressure relief mechanism 213 in the embodiments of the present application is located on a first wall 21a will be described below, but the present application is not limited thereto.

The battery cell 20 in the embodiments of the present application may include: a pressure relief mechanism 213, the pressure relief mechanism 213 being disposed on at least one wall of the battery cell 20, and the pressure relief mechanism 213 being configured to be actuated when an internal pressure or temperature of the battery cell 20 reaches a threshold, to relieve the internal pressure; and a protective film 50 enclosing an outer surface of the at least one wall, the protective film 50 being configured to provide insulation protection for the at least one wall; where the protective film 50 includes a first portion 50, and the first portion 50 at least covers the pressure relief mechanism 213.

Figure 7A:
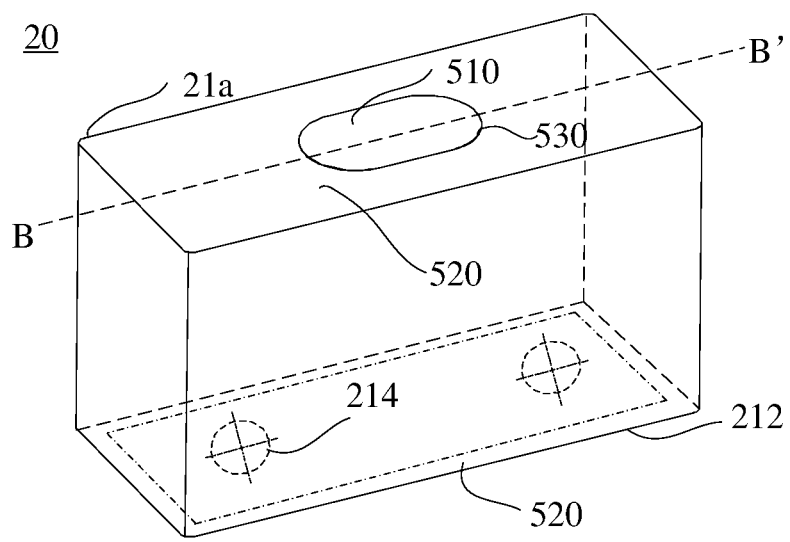
FIG. 7a is a schematic diagram of a battery cell disclosed in an embodiment of the present application.
Figure 7B:
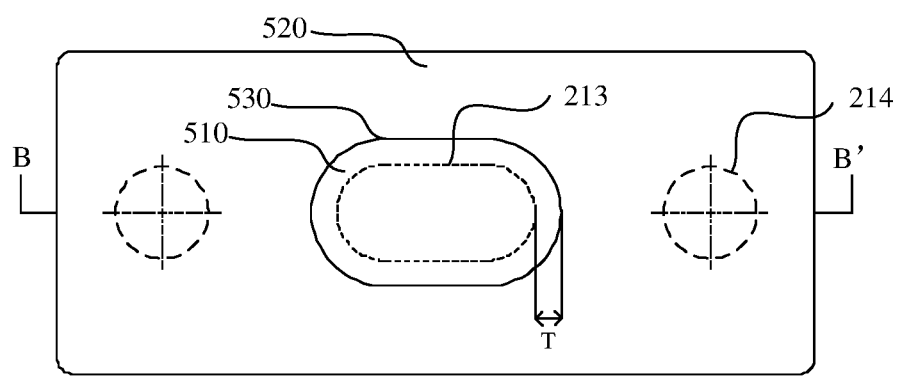
Figure 7C:
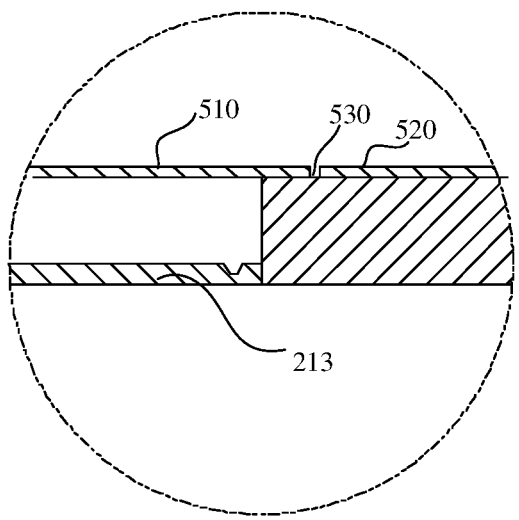
FIG. 7c is a partial detailed view corresponding to a protective film.

FIGS. 7a to 7c show schematic diagrams of a battery cell covered with a protective film according to an embodiment of the present application. FIG. 7a is a schematic diagram of a battery cell according to an embodiment of the present application, FIG. 7b is a plan schematic diagram corresponding to the battery cell in FIG. 7a, and FIG. 7c is a partial detailed view corresponding to the protective film.

It should be understood that, for convenience of visual display of a first wall 21a, in the embodiment of the present application, the battery cell 20 in the drawing is placed upside down, that is, the first wall 21a faces upward and a cover plate 212 is located at the bottom. However, the representation in the drawing of the embodiment of the present application is only for convenience of visual display, and does not impose other restrictions on the structure of the battery cell 20. For example, the first wall 21a in FIG. 7a faces upward, and the cover plate 212 faces downward, where an electrode terminal 214 and the like may be disposed on the cover plate 212.

As shown in FIGS. 7a to 7c, the battery cell 20 includes a pressure relief mechanism 213, and a shape of the pressure relief mechanism 213 may be oblong, circular, elliptical, polygonal, or the like. As shown in FIGS. 7a and 7b, the pressure relief mechanism 213 is oblong, and the longest distance between two points on arcs at both ends is a long diameter of the oblong. A direction of the long diameter is parallel to a direction of a line between two electrode terminals 214. Certainly, the direction of the long diameter of the pressure relief mechanism 213 can also be set to be perpendicular to the direction of the line of the two electrode terminals. The pressure relief mechanism 213 may include a layer of pressure relief sheet, or may include multiple layers of pressure relief sheets stacked at intervals. The pressure relief sheet may be made of metal foil, such as aluminum foil or copper foil. The pressure relief sheet of the pressure relief mechanism 213 may be in a plane lamina shape, which does not occupy the extra volume of the battery cell, and improves the energy density. The pressure relief sheet of the pressure relief mechanism 213 may also be set in an arc or wave shape, and a certain amount of pre-deformation or pre-stress may be set according to the gas producing condition of the battery cell, to offset the deformation effect caused by some of gas production.

The pressure relief mechanism 213 is disposed on at least one wall of the battery cell 20, for example, on the first wall 21a, the side wall 21b of the housing 211 or at the junction of the first wall 21a or the side wall 21b described above here. Certainly, the pressure relief mechanism 213 may also be located on the cover plate 212 of the battery cell 20. The housing 211 of the battery cell 20 may be integrally formed to form an accommodating cavity for accommodating an electrode assembly, the electrode assembly is placed into the accommodating cavity from an opening of the housing 211, the opening is covered with the cover plate 212, and the cover plate 212 and the housing 211 are hermetically connected. The cover plate 212 may be provided with functional parts such as electrode terminals and an liquid injection hole (not shown in the drawing), and a thickness of the cover plate 212 may be set to be greater than a thickness of the housing 211 to maintain sufficient rigidity and intensity.

The battery cell 20 further includes a protective film 50, and the protective film 50 encloses an outer surface of the first wall 21a. Optionally, as shown in FIG. 7a, the protective film may enclose most of the area of the first wall 21a, or may completely enclose the first wall 21a. Certainly, the protective film may further enclose side walls of the housing 211, and the like (for example, dotted portions on the cover plate 212 toward the bottom shown in FIG. 7a, which can represent that the protective film 50 basically covers the entire surface of the housing 211 and edges of the protective film 50 cover four sides of the cover plate 212 by a certain distance to maintain that the protective film 50 can completely cover all the outer surfaces of the housing 211 under a predetermined tension). The protective film 50 may be made of polyester resin or polypropylene material, and may have a thickness of 0.03 mm to 0.50 mm, optionally, the protective film 50 may be 0.1 mm to insulate and protect the metal cover plate and the housing of the battery cell 20.

The housing 211 and/or the cover plate 211 are enclosed with the protective film 50 after the steps such as a performance test are performed on the battery cell 20 during the molding process of the battery cell 20, to keep the protective film 50 completely attached to the housing 211 and/or the cover plate 212 to avoid air bubbles between them, and then the final size detection or the like is performed to complete the molding of the battery cell 20. Since the protective film 50 needs to tightly enclose the housing 211 and/or the cover plate 212 of the battery cell 20 in a large area to insulate and protect the battery cell 20, the pressure relief mechanism disposed on the housing 211 and/or the cover plate 212 may be optionally disposed on an inner side of these plates, or the point of the pressure relief mechanism at the outermost side does not protrude beyond the outer surface of these plates. When it is necessary to process corresponding fixing structures to install the pressure relief mechanism, optionally, the points of these fixing structures at the outermost side do not protrude beyond the outer surface of these plates. When a plurality of battery cells 20 are arranged in parallel or in series or in series and parallel to form a battery module or a battery pack, it is particularly important to keep a housing 211 and/or a cover plate 212 of each battery cell insulated from each other through the protective film 50.

A first portion 510 of the protective film 50 at least covers the pressure relief mechanism 213. When the protective film 50 encloses the housing of the battery cell 20 in a large area, the protective film 50 also covers the pressure relief mechanism 213 from the outer side of the pressure relief mechanism 213. A portion of the protective film 50 that covers the pressure relief mechanism 213 is the first portion 510 of the embodiment of the present application. As shown in FIGS. 7b and 7c, the first portion 510 completely covers the pressure relief mechanism 213 from the outer side of the pressure relief mechanism 213 far away from the battery cell 20, thereby limiting an amount of deformation of the pressure relief mechanism 213 in a thickness direction of the housing 211, and avoiding creep failure and/or respiratory failure of the pressure relief mechanism 213 during the use.

By providing the protective film 50 at least covering a surface of at least one wall of the pressure relief mechanism 213 for the battery cell 20, on one hand, a surface of the battery cell can be insulated and protected, thereby improving insulation and isolation performance of the battery cell, and on the other hand, the deformation of the pressure relief mechanism 213 can be limited using the first portion 510 of the protective film 50 that covers the pressure relief mechanism 213, creep of the pressure relief mechanism 213 can be reduced, and the service life of the pressure relief mechanism 213 can be increased.

Meanwhile, compared with the solution in the prior art that an additional protective patch is disposed on an outer side of a pressure relief mechanism, the solution of the embodiment of the present application can directly apply the protective film of the battery cell to protect the pressure relief mechanism, which has an effect of protecting a patch and an effect of suppressing deformation. There is no need to additionally process fixing structures on the housing or the cover plate to fix a protective patch, and there is no need to additionally provide a protective patch, which saves production materials, reduces processing procedures, and reduces the manufacturing costs of the battery cell.

As an implementation manner, at least one wall of the battery cell 20 in the embodiment of the present application may include a housing 211, the housing 211 forms an accommodating cavity with an opening for accommodating an electrode assembly of the battery cell 20, and the protective film 50 encloses an outer surface of the housing 211.

Optionally, the housing 211 forms the accommodating cavity, which can be treat as the structural shape of the battery cell 20, for accommodating the electrode assembly. When the battery cell 20 is a square housing battery, the housing 211 includes 4 side walls and the first wall 21a except the cover plate 212, the protective film 50 covers 5 walls except the cover plate 212; and when the battery cell 20 is a cylindrical battery, the housing 211 may include a cylindrical peripheral wall, or may include a cylindrical peripheral wall and a bottom wall. The pressure relief mechanism 213 is disposed on the housing 211 enclosed by the protective film 50 described above. The enclosing may be to completely enclose the outer surface of the housing 211, or may be to enclose a portion of the outer surface of the housing 211.

As an implementation manner, since a thickness of the housing 211 is less than a thickness of the cover plate 212, the housing 211 deforms more easily under the impact of gas production inside the battery cell 20. When the pressure relief mechanism 213 is disposed on the first wall 21a and/or a side wall of the housing 211, the pressure relief mechanism 213 also deforms more easily. The protective film 50 can limit the deformation of the pressure relief mechanism 213, thereby prolonging the service life of the pressure relief mechanism 213.

Alternatively, the pressure relief mechanism 213 in the embodiment of the present application may also be located on the cover plate 212. In this case, the same protective film 50 as the protective film 50 enclosing the housing 211 may also be used to cover all the outer surfaces of the cover plate 212 including the pressure relief mechanism 213, or cover at least a portion of the outer surface of the cover plate 212 including the pressure relief mechanism 213.

As an implementation manner, an area of the first portion 510 of the protective film 50 in the embodiment of the present application is larger than an area of a region where the pressure relief mechanism 213 is located, and a region of the first portion 510 that exceeds the pressure relief mechanism 213 is adhered to the outer surface of the at least one wall.

As shown in FIG. 7b, a dashed portion in the middle of the oblong region in FIG. 7b is an edge of the pressure relief mechanism 213 covered by the protective film 50, and a portion with a solid line at an outer side the pressure relief mechanism 213 is an edge of the first portion 510 of the protective film 50. The edge of the first portion 510 exceeds the edge of the pressure relief mechanism 213, that is, the area of the first portion 510 is larger than the area of the region where the pressure relief mechanism 213 is located. A portion of the first portion 510 that exceeds the pressure relief mechanism 213 may be fixedly connected to the at least one wall of the battery cell 20, and the portion of the first portion 510 that is fixedly connected to the at least one wall maintains tension of the protective film 50, so that the protective film 50 has a certain rigidity. When the pressure relief mechanism 213 undergoes creep deformation or respiratory deformation, the first portion 510 can suppress the deformation of the pressure relief mechanism 213 using the rigidity, and an amount of creep deformation of the pressure relief mechanism 213 can reduced, thereby increasing the service life of the pressure relief mechanism 213.

It should be understood that the first portion 510 of the protective film 50 in the embodiment of the present application can limit the deformation of the pressure relief mechanism 213 to some extent. When the internal pressure of the battery cell 20 reaches or exceeds an actuation threshold of the pressure relief mechanism 213, the pressure relief mechanism 213 is activated, and the first portion 510 is also damaged, thereby ensuring the normal operation of the pressure relief mechanism 213 and ensuring the safety performance of the battery.

Specifically, for example, when the battery cell 20 is in normal use, the internal air pressure of the battery cell 20 generally does not exceed 0.5 MPa. During the normal use, the first portion 510 can suppress the deformation of the pressure relief mechanism 213. However, when the internal air pressure exceeds 0.5 MPa, the amount of deformation of the pressure relief mechanism 213 is too great, and the first portion 510 can be broken through from the surface of the at least one wall, so that the pressure relief mechanism 213 can be actuated normally to release the internal pressure.

As an implementation manner, a shape of the first portion 510 of the protective film 50 in the embodiment of the present application is the same as or similar to that of the pressure relief mechanism 213.

As shown in FIG. 7b, the shape of the first portion 510 is the same as that of the pressure relief mechanism 213. The shapes of the two are set to be the same so that tension generated by the deformation of the pressure relief mechanism 213 that the first portion 510 is subjected to is uniform, which is more beneficial to suppression of the deformation of the pressure relief mechanism 213 by the first portion 510, or the two may be in similar shapes or different shapes, such as rectangles, which is not limited in the embodiments of the present application.

As an implementation manner, a distance T by which an edge of the first portion 510 in the embodiment of the present application exceeds an edge of the pressure relief mechanism 213 is 6 mm~10 mm in a direction far away from a center of the pressure relief mechanism 213.

As shown in FIG. 7b, a distance between the edge of the first portion 510, that is, the solid line portion in the middle, and the edge of the pressure relief mechanism 213, that is, the dotted portion in the middle, may be set to be 6 mm to 10 mm. Since a portion of the first portion 510 that exceeds the edge of the pressure relief mechanism 213 is adhered to the at least one wall of the battery cell 20, there is a certain restraint between the two. By adjusting the distance by which the edge of the first portion 510 exceeds the edge of the pressure relief mechanism 213, the magnitude of a restraining force between the first portion 510 and the at least one wall of the battery cell 20 can be adjusted, and it can be ensured that the first portion 510 can have a suppression effect on the deformation of the pressure relief mechanism 213 during the normal use of the battery cell 20. Optionally, when the area of the pressure relief mechanism 213 is large and a great amount of creep deformation occurs, a greater distance T needs to be set to produce a restraining force on the great amount of deformation, and when the area of the pressure relief mechanism 213 is small, a less distance T can be set. When the internal pressure and temperature of the battery cell 20 reach a certain threshold and the internal pressure needs to be released, the setting of the distance T can enable the first portion 510 to be broken through by the pressure relief mechanism 213 and fall off from the at least one wall of the battery cell 20, which does not affect the normal use of the pressure relief mechanism 213, and further ensures the safety of the battery.

For example, the edge of the first portion 510 can be set to exceed the edge of the pressure relief mechanism 213 by 6 mm. When the battery cell 20 is in normal use, its internal pressure is generally not greater than 0.5 MPa. In this case, the restraining force between the first portion 510 and the at least one wall is great enough to ensure that the first portion 510 is not broken through by the pressure relief mechanism 213 to fall off. When the internal pressure of the battery cell 20 is greater than 0.5 MPa, the deformation of the pressure relief mechanism 213 can cause the first portion 510 to fall off from the at least one wall.

It should be understood that the relationship between the falling off of the first portion 510 and the internal pressure of the battery cell 20 is merely exemplarily described above, and the magnitude of the pressure and the set size therein may also be set to be other values, which is not limited in the embodiments of the present application.

As an implementation manner, the protective film 50 in the embodiment of the present application may be made of polyester resin (Polyethylene terephthalate, PET) or polypropylene PP material. The protective film 50 may also be a blue film commonly used in the field of batteries, or optionally, the protective film 50 in the embodiment of the present application may also be made of other materials, which is not limited in the embodiments of the present application.

As an implementation manner, the protective film in the embodiment of the present application may further include an isolation region 530 and a second portion 520, the first portion 510 is separated from the second portion 520 by the isolation region 530, and the second portion 520 covers an outer surface of the at least one wall other than a region covered by the first portion 510.

As shown in FIGS. 7a to 7c, the protective film 50 may include the first portion 510 and the second portion 520, where the first portion 510 and the second portion 520 are separated by the isolation region 530, the first portion 510 at least covers the outer surface of the pressure relief mechanism 213 disposed on the at least one wall, and the second portion 520 covers an outer surface of the at least one wall other than the outer surface covered by the first portion 510. Optionally, the second portion 520 may cover regions of all the walls of the battery cell 20 other than the region covered by the first portion 510, that is, the second portion 520 may cover all the outer surfaces of peripheral walls and a top cover other than the outer surface covered by the first portion 510, or the second portion 520 may also cover only a portion of them, for example, only an outer surface of a wall containing the pressure relief mechanism 213 other than the outer surface covered by the first portion 510, such as the first wall 21a in FIGS. 7a to 7c.

Optionally, the isolation region 530 in the embodiment of the present application may be a linear region, the region includes a missing portion of the protective film 50. As shown in FIG. 7c, the isolation region 530 includes a portion between the first portion 510 and the second portion 520 of the protective film 50 that lacks a part of the material of the protective film 50, that is, the two portions are separated in material. The linear isolation region 530 as shown in FIGS. 7a to 7c may also be an isolation band with a relatively wide width, which is not limited in the present application.

As an implementation manner, the isolation region 530 in the embodiment of the present application may be disposed around an outer edge of the pressure relief mechanism 213.

As shown in FIG. 7b, the isolation region 530 is disposed around the edge of the pressure relief mechanism 213 to form the first portion 510 at least covering the pressure relief mechanism 213 and the second portion 520 covering the outer surface other than the region covered by the first portion 510.

As an implementation manner, the isolation region 530 in the embodiment of the present application may be coherent, and the first portion 510 and the second portion 520 are not connected.

Specifically, as shown in FIG. 7b, the isolation region 530 is in a coherently annular shape, and the first portion 510 and the second portion 520 can be completely separated by the isolation region 530, that is, there is no connecting point between the first portion 510 and the second portion 520. In this case, since there are partially adhered regions between the first portion 510 and the surface of the at least one wall, a restraining force exists between the partially adhered regions can ensure that the first portion 510 has a suppression effect on the deformation of the pressure relief mechanism 213, thereby suppressing creep of the pressure relief mechanism 213, and increasing the service life of the pressure relief mechanism 213. Meanwhile, when the internal pressure and temperature of the pressure relief mechanism 213 reach a certain threshold, the first portion 510 may be broken through to allow the first portion 510 to fall off from the surface of the at least one wall, so that the pressure relief mechanism 213 is normally actuated to discharge the internal emissions, and ensure the safe use of the battery.

It should be understood that when the isolation region 530 in the embodiment of the present application is coherent, and there is no connecting point between the first portion and the second portion, the area of the first portion 510 of the protective film 50 in the embodiment of the present application may be larger than the area of the region where the pressure relief mechanism 213 is located, so as to ensure that a partial region of the first portion 510 can be adhered to the surface of the at least one wall, thereby producing a restraining force that can suppress the deformation of the pressure relief mechanism 213.

As another implementation manner, the isolation region 530 in the embodiment of the present application may be incoherent, a connecting point 540 is disposed between the first portion 510 and the second portion 520, and the first portion 510 and the second portion 520 are connected through the connecting point 540.

Figure 8:
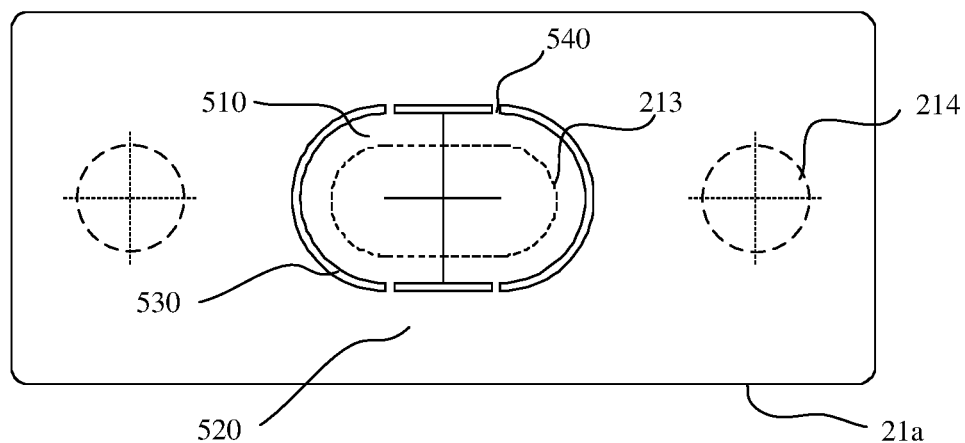
FIG. 8 is a plan schematic diagram of an isolation region disclosed in an embodiment of the present application.

Specifically, FIG. 8 shows a plan schematic diagram of an incoherent isolation region in an embodiment of the present application. As shown in FIG. 8, the isolation region 530 is further provided with connecting point 540, that is, the first portion 510 and the second portion 520 can be connected through the connecting point 540, and the first portion 510 and the second portion 520 are not completely separated. The second portion 520 may have effects of restraining on and transmitting force to the first portion 510 through the connecting point 540. In this case, the edge region of the first portion 510 may be set to be relatively small accordingly.

As an implementation manner, a number of connecting points 540 in the embodiment of the present application may be positively correlated with a size of an edge of the first portion 510 that exceeds an edge of the pressure relief mechanism 213 in a direction far away from a center of the pressure relief mechanism 213.

It can be seen from the above that the adhered portion between the first portion 510 of the protective film 50 and the at least one wall of the battery cell 20 may produce a restraining force to suppress the deformation of the pressure relief mechanism 213. Within a certain range, the distance by which the edge of the first portion 510 exceeds the edge of the pressure relief mechanism 213 in the direction far away from the center of the pressure relief mechanism 213 is greater, and an adhesive force produced between the two is greater. When the connecting point 540 is disposed on the isolation region 530, since the connecting point 540 connect the first portion 510 and the second portion 520, the second portion 520 may have a restraining force for the first portion 510, and the second portion 520 encloses other areas of at least one housing, is tightly adhered to the housing, and has a strong restraining force. Therefore, by providing the connecting point 540, the restraining force for the first portion 510 can be enhanced with the help of a fixing force such as the adhesion between the second portion 520 and the at least one wall, thereby reducing the area of the first portion 510. Within a certain range, the number of connecting points 540 is greater, the restraining force produced by the existence of the connecting points 540 is greater. Therefore, further, the number of connecting points 540 may be set to be correlated with the area of the foregoing adhered portion, that is, the size of the edge of the first portion 510 that exceeds the edge of the pressure relief mechanism 213 in the direction far away from the center of the pressure relief mechanism 213 is greater, and the number of provided connecting points 540 is less. On the contrary, the foregoing size is less, and the number of provided connecting points 540 is more. In this way, the restraining force produced by the portion where the first portion 510 is adhered to the surface of the at least one wall and the restraining force produced by the existence of the connecting points 540 can suppress the deformation of the pressure relief mechanism 213 together, and could ensure that the first portion 510 can be broken through to fall off when the internal pressure and temperature of the press relief mechanism 213 reach a certain threshold, thereby ensuring the normal actuation of the pressure relief mechanism 213.

As an implementation manner, the battery cell 20 in the embodiment of the present application includes two electrode terminals 214 with opposite polarities, and at least two connecting points 540 are disposed along a direction of a line between the two electrode terminals 214.

As shown in FIG. 8, the battery cell 20 includes two electrode terminals 214, which may include a positive electrode terminal and a negative electrode terminal. When the pressure relief mechanism 213 is arranged in the manner shown in FIG. 8, that is, corresponding to a case where the pressure relief mechanism 213 is located on the first wall 21a or the cover plate 212, a direction of a long diameter of the oblong pressure relief mechanism 213 is parallel to a direction of a line between the two electrode terminals 214. When the pressure relief mechanism 213 deforms, the position of the maximum amount of deformation is at the direction of the line of the two electrode terminals 214. Corresponding to the first portion 510, in order to suppress the deformation of the pressure relief mechanism 213 better, according to the deformation characteristics of the pressure relief mechanism 213, the connecting points 540 may be disposed in a straight line portion located in the isolation region 530 that is parallel to the line of the two electrode terminals, as shown in FIG. 8.

Optionally, the pressure relief mechanism 213 in the embodiment of the present application may not be arranged in the manner shown in FIG. 8. In an example that the pressure relief mechanism 213 is oblong, the pressure relief mechanism 213 may be arranged in a manner such that the direction of the long diameter of the pressure relief mechanism 213 is perpendicular to the direction of the line of the two electrode terminals 214. In this case, the arrangement of the positions of the connecting points 540 may also be set according to the foregoing principle, that is, the connecting points 540 are disposed in a region of the isolation region 530 that is parallel to the direction of the line of the two electrode terminals 214. In other words, the arrangement of the positions of the connecting points 540 in the embodiment of the present application has a direct relationship with the direction of the line of the electrode terminals, but has no direct relationship with the shape and arrangement of the pressure relief mechanism 213.

As an implementation manner, the connecting point 540 may also be disposed at other positions of the isolation region 530 in the embodiment of the present application.

Figure 9:
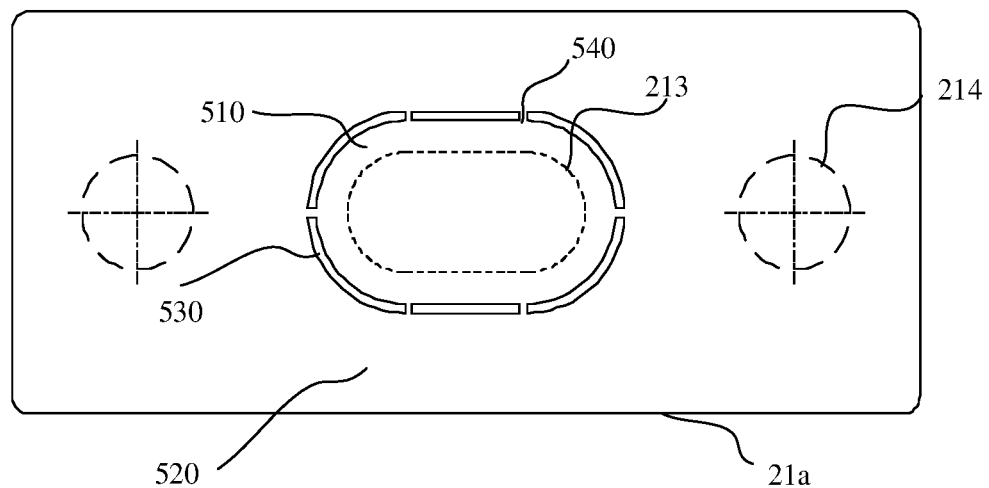
FIG. 9 is a plan schematic diagram of another isolation region disclosed in an embodiment of the present application.

FIG. 9 shows a schematic diagram of another incoherent isolation region according to an embodiment of the present application. As shown in FIG. 9, the connecting points 540 may also be disposed in curved portions of the isolation region 530 to enhance the suppression effect of the first portion 510 on the deformation of the pressure relief mechanism 213. The isolation region 530 in the embodiment of the present application may include a plurality of connecting points 540, and the plurality of connecting points 540 may be distributed at equal intervals, for example, arranged at equal angles or arc lengths, or may be distributed at unequal intervals. The number and the arrangement of positions of connecting points 540 are not limited in the embodiments of the present application.

In the foregoing description, the area of the first portion 510 is larger than the region where the pressure relief mechanism 213 is located. Optionally, when the connecting points 540 are disposed on the isolation region 530, the edge of the first portion 510 may overlap with the edge of the pressure relief mechanism 213.

Figure 10:
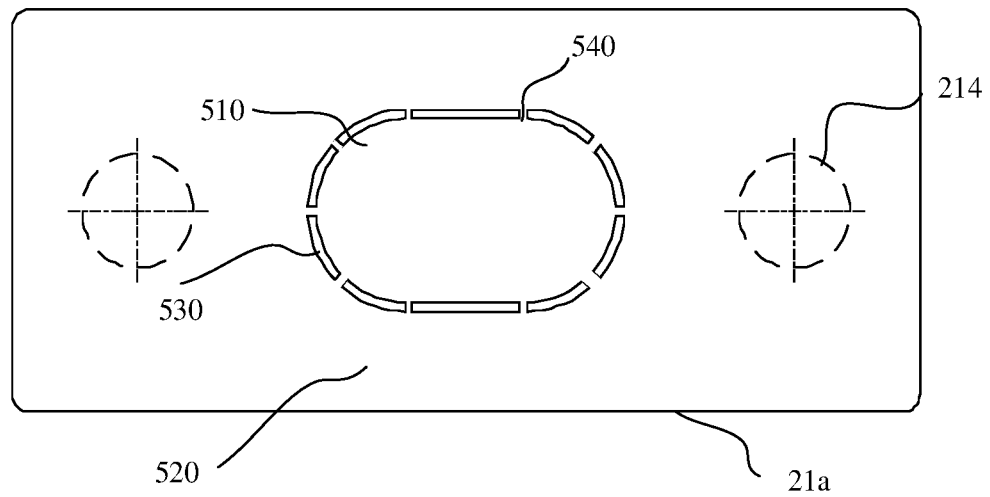
FIG. 10 is a plan schematic diagram of another isolation region disclosed in an embodiment of the present application.

Specifically, FIG. 10 shows a schematic diagram of another incoherent isolation region in an embodiment of the present application. As shown in FIG. 10, since the edge of the first portion 510 overlaps with the edge of the pressure relief mechanism 213, only the edge of the first portion 510 is marked in FIG. 10. Moreover, FIG. 10 shows another embodiment of a structure of distribution of connecting points 540, that is, a line between a connecting point 540 and a center of a circle of the oblong may also be set as a region where the line and a line between two electrode terminals form a predetermined included angle. The predetermined included angle may be, for example, within a range of 0 degree to 90 degrees, so as to adjust the number of connecting points 540 to adapt to a change in area of the first portion 510. It should be understood that the arrangement schemes of the connecting points 540 shown in FIGS. 8 to 12 of the present application do not strictly correspond to the structure of the first portion 510 in the corresponding drawings, and FIGS. 8 to 12 only exemplarily show the possible arrangement of the connecting points 540, which is not limited thereto.

It should be understood that the pressure relief mechanism 213 of the embodiment of the present application may be disposed on one of walls of the housing 211, such as the first wall 21a described above, for example, as shown in FIGS. 8 to 10, or the pressure relief mechanism in the embodiment of the present application may be disposed on a side wall of the housing 211, but the present application is not limited thereto.

Figure 11:
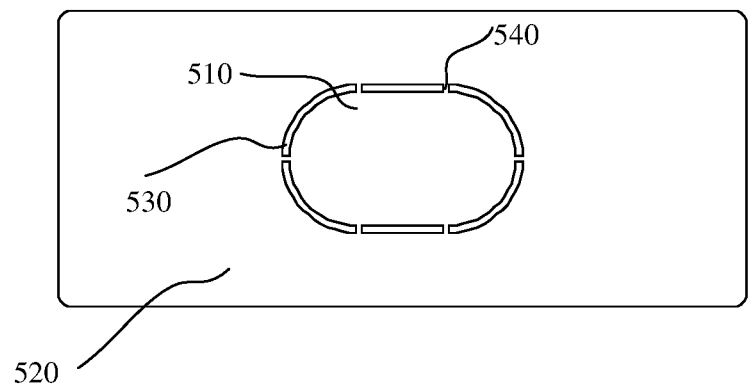
FIG. 11 is a plan schematic diagram of a protective film disclosed in an embodiment of the present application.

Specifically, FIG. 11 shows a plan schematic diagram of a protective film according to an embodiment of the present application. The protective film 50 may be applicable to a case where the pressure relief mechanism 213 is disposed on any one of the walls of the housing 211, such as a side wall or a bottom wall. In this case, the protective film 50 may not be provided with an opening corresponding to an electrode terminal 214. The rest of the content is the same as the foregoing case when the pressure relief mechanism 213 is located on the first wall 21a, which will not be repeated redundantly herein.

Optionally, since the cover plate 212 and the housing 211 of the battery cell 20 are usually two separate parts, in a case where the pressure relief mechanism 213 is disposed on the cover plate 212, the second portion 520 of the protective film 50 may further include a region for accommodating an electrode terminal 214. Specifically, FIG. 12 shows a plan schematic diagram of a protective film 50 according to an embodiment of the present application. As shown in FIG. 12, the protective film 50 may further include openings 550 for accommodating electrode terminals 214.

As an implementation manner, the protective film 50 in the embodiment of the present application may be a patch, and the protective film 50 is adhered to the outer surface of the at least one wall by an adhesive.

For example, the protective film 50 may be a plastic patch, or may be referred to as a blue film, such as a plastic patch made of polyester resin or polypropylene material. The patch may be adhered to an outer surface of at least one wall including a pressure relief mechanism by an adhesive.

Optionally, the protective film 50 in the embodiment of the present application may be adhered to an outer surface of at least one wall by an adhesive, or fixed to the outer surface of the at least one wall by other means, which is not limited in the present application.

When the protective film 50 in the embodiment of the present application is a plastic patch, since the plastic patch is pasted on an outer surface of at least one wall of the battery cell 20, there may a certain gap between the protective film 50 and the pressure relief mechanism 213, that is, the first portion 510 is spaced apart from the pressure relief mechanism 213. When there is a gap between the two, the pressure relief mechanism 213 may deform to some extent in a space allowed by the gap. The first portion 510 suppresses the deformation of the pressure relief mechanism 213 once an amount of deformation of the pressure relief mechanism 213 exceeds the distance of the gap in the thickness direction of the housing 211, the deformation of the pressure relief mechanism caused by respiratory deformation of the housing is reduced, and creep deformation is suppressed, thereby avoiding the failure of the pressure relief mechanism 213 caused by these two kinds of deformation.

Specifically, the first portion 510 of the protective film 50 may suppress a certain degree of deformation of the pressure relief mechanism 213 using the adhesion with the at least one wall and/or the restraining force produced between the first portion 510 and the connecting point 540, and the creep of the pressure relief mechanism 213 can be reduced, thereby increasing the service life of the pressure relief mechanism 213.

Optionally, when the protective film 50 in the embodiment of the present application adopts the manner of the foregoing patch, an isolation region 530 may be formed by laser ablation of the protective film 50.

Specifically, at least one wall of the battery cell 20 may be first covered with the foregoing patch. In this case, the patch is a complete whole, and then an isolation region 530 is formed on the patch through a laser cutting process, thereby dividing the protective film 50 into a first portion 510 and a second portion 520.

The first portion 510 for suppressing the deformation of the pressure relief mechanism 213 may be formed on the basis of the protective film 50 through the isolation region 530 in the embodiment of the present application obtained by the laser ablation process. On one hand, using the existing process flows, timely adjustment of the shape and size of the protective film 50 may be implemented by controlling a motion track and ablation power of a laser head, and there is no need to repeat open molding, thereby reducing the processing costs. On the other hand, the processed protective film 50 may insulate and protect the battery cell 20. For example, in a liquid injection process during the production of the battery cell 20, the processed protective film 50 can effectively prevent an electrolytic solution from being in contact with the pressure relief mechanism 213, thereby protecting the pressure relief mechanism 213, and the suppression of a certain degree of deformation of the pressure relief mechanism 213 can be implemented, thereby increasing the service life of the pressure relief mechanism 213.

As another implementation manner, the protective film 50 in the embodiment of the present application may also be a coating, and outer surfaces of the at least one wall and the pressure relief mechanism 213 are coated with the protective film 50 by means of spraying.

When the protective film 50 adopts a coating, an isolation region 530 may be formed by skipping coating some reserved region when surfaces of the at least one wall and the pressure relief mechanism 213 are coated with the protective film 50. For example, a template may be placed in advance at the position of the isolation region 530 to prevent the coating from being sprayed on the position of the isolation region 530.

Optionally, when the protective film 50 adopts a coating, the coating may directly cover the surface of the pressure relief mechanism 213. Since a coating with a great thickness may have a greater restraint effect on the deformation of the pressure relief mechanism 213, in this case, the coating thickness of the first portion 510 can be set to be greater than the coating thickness of the second portion 520, so as to achieve a better effect of suppressing the deformation of the pressure relief mechanism 213.

Optionally, when the protective film 50 in the embodiment of the present application adopts a coating, since the first portion 510 and the pressure relief mechanism 213 are adhered to each other, there is a certain restraint between the two, and the edge of the first portion 510 can overlap with the edge of the pressure relief mechanism 213, or the edge of the first portion 510 can be set to exceed the edge of the pressure relief mechanism 213 according to the foregoing embodiment. Further, a connecting point 540 may be disposed on the isolation region 530, and the specific implementation manner is not limited in the embodiments of the present application.

As an implementation manner, the battery 10 in the embodiments of the present application may include a plurality of battery cells, and the plurality of battery cells include at least one battery cell 20 in each of the foregoing embodiments, where the plurality of battery cells 20 are insulated from each other through the protective film 50.

An embodiment of the present application further provides a power consumption apparatus, and the power consumption apparatus may include the battery 10 in each of the foregoing embodiments. Optionally, the power consumption apparatus may be a vehicle 1, a ship or a spacecraft.

The battery cell, the battery and the power consumption apparatus according to the embodiments of the present application are described above. A method and an apparatus for producing a battery according to the embodiments of the present application will be described below, and for the parts that are not described in detail, reference is made to each of the foregoing embodiments.

FIG. 13 shows a schematic flowchart of a method 300 for producing a battery cell according to an embodiment of the present application. As shown in FIG. 13, the method 300 may include:

S310, disposing a pressure relief mechanism 213 on at least one wall of the battery cell 20.

As an implementation manner, the pressure relief mechanism 213 is configured to be actuated when an internal pressure or temperature of the battery cell 20 reaches a threshold, to relieve the internal pressure.

S320, an outer surface of the at least one wall is enclosed with a protective film 50, the protective film 50 being configured to provide insulation protection for the at least one wall.

As an implementation manner, the protective film 50 includes a first portion, and the first portion at least covers the pressure relief mechanism 213.

FIG. 14 shows a schematic block diagram of an apparatus 400 for producing a battery cell according to an embodiment of the present application. As shown in FIG. 14, the apparatus 400 for producing a battery may include: a setting module 410.

The setting module 410 is configured to: dispose a pressure relief mechanism 213 on at least one wall of the battery cell 20, the pressure relief mechanism 213 being configured to be actuated when an internal pressure or temperature of the battery cell 20 reaches a threshold, to relieve the internal pressure; and cover an outer surface of the at least one wall with a protective film 50, the protective film 50 being configured to provide insulation protection for the at least one wall; where the protective film 50 includes a first portion 510, and the first portion at least covers the pressure relief mechanism 213.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery cell, comprising:
a pressure relief mechanism, the pressure relief mechanism being disposed on at least one wall of the battery cell, and the pressure relief mechanism being configured to be actuated when an internal pressure or temperature of the battery cell reaches a threshold, to relieve the internal pressure; and
a protective film enclosing an outer surface of the at least one wall, the protective film being configured to provide insulation protection for the at least one wall;
wherein the protective film comprises a first portion, and the first portion at least covers the pressure relief mechanism, the protective film further comprises an isolation region and a second portion, the first portion is separated from the second portion by the isolation region, and the second portion covers an outer surface of the at least one wall other than a region covered by the first portion;
wherein the isolation region is coherent, and the first portion and the second portion are not connected.

2. The battery cell according to claim 1, wherein an area of the first portion is larger than an area of a region where the pressure relief mechanism is located, and a region of the first portion that exceeds the pressure relief mechanism is adhered to the outer surface of the at least one wall.

3. The battery cell according to claim 1, wherein a shape of the first portion is the same as or corresponds to a shape of a top-down plan view of the pressure relief mechanism.

4. The battery cell according to claim 1, wherein an edge of the first portion exceeds an edge of the pressure relief mechanism by 6 mm~10 mm in a direction far away from a center of the pressure relief mechanism.

5. The battery cell according to claim 1, wherein the battery cell comprises a housing, the housing comprises the at least one wall, the housing forms an accommodating cavity with an opening for accommodating an electrode assembly of the battery cell, and the protective film encloses an outer surface of the housing.

6. The battery cell according to claim 1, wherein the isolation region is disposed around an outer edge of the pressure relief mechanism.

7. The battery cell according to claim 1, wherein the protective film is a patch, and the protective film is adhered to the outer surface of the at least one wall by an adhesive.

8. The battery cell according to claim 7, wherein the first portion is spaced apart from the pressure relief mechanism.

9. The battery cell according to claim 7, wherein an isolation region is formed by laser ablation of the protective film.

10. The battery cell according to claim 1, wherein the protective film is a coating, and outer surfaces of the at least one wall and the pressure relief mechanism are coated with the protective film by means of spraying.

11. The battery cell according to claim 10, wherein an isolation region is formed by skipping coating some reserved region when surfaces of the at least one wall and the pressure relief mechanism are coated with the protective film.

12. The battery cell according to claim 10, wherein a thickness of the first portion is greater than a thickness of a second portion.

13. A battery, comprising:
a plurality of battery cells, the plurality of battery cells comprising at least one battery cell according to claim 1; wherein the plurality of battery cells are insulated from each other through the protective film.

14. A power consumption device, comprising: the battery according to claim 13.

* * * * *